United States Patent Office 3,023,185
Patented Feb. 27, 1962

3,023,185
PLASTICIZERS FOR VINYL-TYPE RESINS
Jeffrey H. Bartlett, Westfield, Isidor Kirshenbaum, Union, Fred W. Banes, Westfield, and Clifford W. Muessig, Colonia, N.J., assignors to Esso Research and Engineering Company, a corporation of Delaware
No Drawing. Filed Sept. 4, 1956, Ser. No. 607,564
1 Claim. (Cl. 260—31.6)

The present invention relates to plasticizers and particularly to the use of certain esters as plasticizers in synthetic resins. Specifically, it relates to the addition of esters of trimethylol alkanes to resins and the products obtained therefrom.

Plasticizers, such as di-isooctyl phthalate (DIOP) and di-2-ethyl hexyl phthalate (DOP), have been used extensively in plastic and rubbery compositions. While they are effective plasticizers in certain respects, they are not entirely satisfactory because of their low stability and high volatility.

It has now been discovered that esters of trimethylol $C_4$ to $C_5$ alkanes, particularly those prepared with acids having between about 6 and 8 carbon atoms, are excellent plasticizers for synthetic resins, especially those made with vinyl compounds. Furthermore, it has been discovered that while either iso or normal acids may be employed to prepare the esters, mixtures of normal and iso acids produce plasticizers superior to those obtained with normal acids. This is an unexpected finding because all previous work has taught that normal acid esters are eminently better plasticizers than branched chain acid esters. These outstanding plasticizers are obtained by esterifying the trimethylol alkanes with a mixture of oxo and normal acids having an average carbon number between about 6 and 8, and a ratio oxo to normal of from 1:2 to 2:1.

In addition, it has been discovered that certain crude trimethylol alkanes may be esterified and used as a plasticizer without further purification. It is believed that the crude product contains compounds having four alcohol groups which, upon esterification, produce a plasticizer of low volatility and good aging characteristics.

In the practice of the present invention esters of trimethylol alkanes, which have between about 7 and 8 carbon atoms, are combined with a solid polymer, such as a resin, to form a product having aging characteristics superior to those polymers treated with conventional plasticizers.

The amount of plasticizer employed will vary according to the particular polymer and type of product desired, but will always be a minor proportion in relation to the polymer. In view of data obtained in earlier studies, it is generally desirable to use between about 25 and 75 parts by weight of plasticizer per 100 parts by weight of the polymer, and it is preferred to use between about 40 and 60 parts by weight of plasticizer. For instance, in the case of resins prepared with vinyl chloride, a satisfactory formula may contain about 50 parts by weight.

The aldehyde from which the trimethylol derivative is prepared is made according to well-known techniques; for example, by reacting a $C_4$ to $C_5$ olefin, such as butene-1, isobutylene, isopentene, pentene-1, with carbon monoxide and hydrogen in the presence of a cobalt-containing catalyst to produce a predominantly branched-chain aldehyde adduct having one more carbon atom than the feed compound. The pressure and temperature should be between 2000 and 6000 p.s.i.g. and 100 and 180° C., respectively. The aldehyde may be purified by any conventional method such as distillation.

In discussing the Oxo reaction of olefin hydrocarbons, it is convenient to classify the various olefins into five fundamental types, according to the character of the carbon atoms linked to the olefinic bond. These five types are as follows:

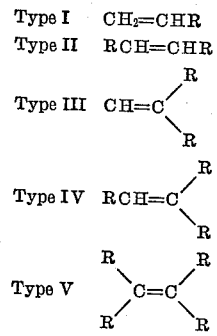

In the above formulas, R represents a straight or a branched-chain alkyl group, it being understood that where more than one symbol R appears in a formula they may represent the same alkyl group or different alkyl groups. Under this classification, for example, butene-1, 3-ethyl pentene-1, or 4,4-dimethyl pentene-1 are Type I olefins; butene-2, 4,4-dimethyl pentene-2, 2-methyl 5-ethyl hexene-3 are Type II olefins; 2,3,3-trimethyl butene-1 is a Type III olefin; 2,4-dimethyl pentene-2 is a Type IV olefin; tetramethyl ethylene is a Type V olefin; and so forth.

In the "Oxo" reactions, generally, there is no invariable point of attack on the olefinic double bond such as one might predict from Markownikoff's rule, and thus in the case of Type I olefins of the formula $H_2C=CHCH_2R$ approximately equal amounts of both $$CHO.CH_2.CH_2.CH_2R$$

and $CH_3.CH(CHO) \cdot CH_2R$ are formed, with the 1-position being slightly favored. It is thus apparent that the "Oxo" process is inherently committed to the production of at least some branched-chain aldehydes even when the starting material is a pure Type I straight-chain olefin. Type V olefins are usually incapable of oxonation. The oxonation feed may contain monoolefins of any type and suitable olefinic feeds may be fractionated, for example, from cracked gases, from Fischer-Tropsch synthesis products or from a polymerized stream of $C_3$ to $C_5$ olefins.

The trimethylol alkanes were prepared from the oxo aldehyde by reaction with formaldehyde in the presence of a caustic. For example, 1.1 moles of sodium hydroxide was added to 1 mole of isovaleraldehyde (prepared from isobutylene), four moles of formaldehyde (37% solution) and 1 mole of isopropyl alcohol. The sodium hydroxide was added slowly with vigorous stirring and the temperature was maintained between about 10 and 15° C. for a period of 3 hours and then heated to a temperature of 50 to 60° C. for another 3 hours. The reaction mixture was then neutralized and two phases separated out. The aqueous phase was extracted with isopropyl alcohol and this extract was added to the organic phase. The isopropyl alcohol was removed by evaporation on a steam bath and the crude product was extracted with acetone, filtered to remove salts and distilled. The trimethylol isobutane recovered boiled between about 135° and 145° C. at about 0.5 mm. pressure. Similar procedures were used for the preparation of trimethylol n-butane (boiling point 135 to 145° C. at 0.5 mm. pressure) and trimethylol pentane (boiling point 135 to 145° C. at 0.2 mm. pressure).

In the preparation of the trimethylol esters, 1 mole of a trimethylol alkane, such as trimethylol butane, and 3.3 moles of acid, such as a 2:1 ratio of normal nonanoic acid and oxo $C_5$ acid, was reacted in 300 cc. toluene at the boiling point of the mixture until no more water can be removed as an azeotrope. About 2 grams of paratoluene sulfonic acid was used as a catalyst. The temperature may be raised gradually by removing solvent in order to more completely esterify the trimethylol compound. The reaction mixture was diluted with toluene and washed with a 5% sodium hydroxide solution and finally with water to remove any salts. The toluene was evaporated on a steam bath and the ester was distilled through a short path still. The esterification generally takes between 2 to 5 hours at a temperature between about 125 to 175° C.

The acids used in the preparation of the esters may have straight chains or branched chains, such as those obtained by the Oxo process and by the addition of carbon monoxide and water to olefins in the presence of strong acids, such as $H_2SO_4$, $BF_3 \cdot H_3PO_4$, $BF_3 \cdot H_2O$ complexes, $H_3PO_4$ and the like. The acids formed by oxonation are quite complex in character and the exact composition of many of these products is unknown. Generally, these acids have one or two small alkyl groups attached to the principal chain. Acids suitable for the purpose of the present invention are 2-methyl butyric, n-valeric, 3-methyl butyric, 2-methyl valeric, n-hexanoic, n-heptanoic, n-octanoic, n-nonanoic, 2-methyl hexanoic, and 3-methyl hexanoic.

The polymers in which the plasticizers of the present invention may be employed may be classified as synthetic resins. The preferred polymers are synthetic resins prepared from vinyl compounds, such as vinyl chloride, vinyl acetate and copolymers thereof. The copolymers are generally composed of about 80 to 95 wt. percent vinyl chloride and 5 to 20 wt. percent vinyl acetate. The polymerization is usually carried out between about 20 and 100° C. in the presence of a peroxide catalyst, such as benzoyl peroxide, acetyl benzoyl peroxide, etc. The specific viscosity (68/68° F.) of these resins is generally between about 0.2 to 1.2.

In addition to the plasticizer, the resin may contain stabilizers, such as barium ricinoleate, cadmium naphthenate, dibasic lead stearate and alkali metal organo phosphates, the latter two sold under the trade names DS 207 and Vanstay, respectively. These substances are generally used in amounts between about 0.1 and 15 parts by weight per 100 parts by weight of polymer, but it is preferred to use between about 1 to 5 parts by weight of stabilizer. In addition, cadmium and calcium stearate can be used as lubricants as well as stabilizers. Phenyl salicylate, resorcinol dibenzoate and phosphates may be used to stabilize the resin against discoloration in sunlight.

The following examples are submitted to give a better understanding of the present invention. In each example the polymer was compounded according to the following formula in which the only variable is the particular plasticizer under consideration.

| Ingredients: | Parts by weight |
|---|---|
| Vinyl chloride resin (Geon 101) | 100 |
| Sodium organophosphate | 2 |
| Dibasic lead stearate | 1 |
| Plasticizer (as indicated) | 50 |

Geon 101 is a 100% polyvinyl chloride resin. It is a white powder having a specific gravity of 1.40±0.05, a specific viscosity of 0.52 to 0.57, a heat loss maximum of 0.5% and an ash of 0.4%. 100 parts by weight of Geon 101 resin was admixed with 2 parts of sodium organophosphate and 1 part dibasic lead stearate to form a dry blend. Next, 50 parts by weight of plasticizer was then combined with the blend until an almost lump-free composition was obtained. The resulting mixture was then homogenized in a suitable mixer, such as a Banbury, and sheeted into a finished product having a thickness of between about 0.075 and 0.15 inch.

EXAMPLE 1

100 grams of a 100% polyvinyl chloride resin, sold under the tradename Geon 101, was compounded with normal heptanoic acid esters of trimethylol butane, trimethylol isobutane and trimethylol pentane, and sheeted off.

In general, it was observed that the esters of the present invention solvate high molecular weight vinyl resins noticeably faster than other plasticizers previously used. This is an important factor because vinyl resin stocks that are exposed to excessive heat generally have poor stability and physical properties.

The sheeted stock was molded at between 300 and 320° F. in a standard ASTM mold (D16–41), yielding slabs 6 x 6 x 0.075 inches. The molding cycle was 10 minutes, at minimum ram pressure, to allow free flow of the resin, followed by 10 minutes at 900 pounds per square inch. The molded slabs were allowed to stand at about room temperature for a day before testing.

Tensile properties of the stock were determined in the usual manner on a Scott tester, the rate of jaw separation being 20 inches per minute.

The aging characteristics of the molded polymer were determined by subjecting samples of molded stock to a temperature of 100° C. for 7 days and thereafter measuring the tensile strength and elongation, as well as the amount of plasticizer lost through evaporation during the aging period. Table I below collates the esters of the present invention with typical commercial products.

*Table I*

| Plasticizer | Physical characteristics after aging 7 days at 100° C. | | | | | |
|---|---|---|---|---|---|---|
| | Tensile, p.s.i. | Elongation, percent | Percent tensile retention | Percent elong. retention | Appearance | Percent plasticizer loss |
| $nC_7$ acid + trimethylolbutane | 2,785 | 335 | 104 | 112 | Clear | 6.5 |
| $nC_7$ acid + trimethylolisobutane | 2,670 | 290 | 96 | 98 | ___do___ | 4.7 |
| $nC_7$ acid + trimethylolpentane | 2,670 | 315 | 102 | 103 | ___do___ | 4.1 |
| DOP | 2,658 | 193 | 90 | 65 | Milky | 24.5 |

The above data show that esters of trimethylol $C_4$ to $C_5$ alkanes made with normal acids containing about 7 carbon atoms are vastly superior to commercial products, such as di-2-ethyl-hexyl phthalate. In the case of the butane and pentane esters the tensile strength and elongation were actually increased after the aging period, indicating a possible enhancing action on the part of these plasticizers. Furthermore, the product made with the plasticizers of the present invention had a much better appearance. Another very important property of these plasticizers is their relative non-volatility. This is brought out by the values under the column labelled "Percent Plasticizer Loss." A perusal of these figures shows the evaporation rate of the trimethylol esters is about ⅕ that of the commercial plasticizers used.

EXAMPLE 2

Samples of Geon 101 were compounded with normal pentanoic, hexanoic and heptanoic acid esters of trimethylol butane (derived from oxonated butene-1), trimethylol isobutane (derived from oxonated isobutylene), and trimethylol pentane (derived from oxonated pentene-1). The volatility of these plasticizers as well as their effect on the low temperature efficiency of the resin, as measured by torsional modulus, is set forth below:

Table II

| Plasticizer | Volatility plast. loss 7 days at 100° C. | Low temperature efficiency [1] torsional modulus (10⁴ units) at −25° C. |
|---|---|---|
| Trimethylolbutane: | | |
| nC₇ acid | 6.5 | 16.0 |
| nC₆ acid | 19.4 | 20.2 |
| nC₅ acid | 49.7 | 27.4 |
| Trimethylolisobutane: | | |
| nC₇ acid | 4.7 | 16.3 |
| nC₆ acid | 17.5 | 18.8 |
| nC₅ acid | 45.2 | 21.2 |
| Trimethylolpentane: | | |
| nC₇ acid | 4.1 | 17.3 |
| nC₆ acid | 10.4 | 21.9 |
| nC₅ acid | 41.5 | 22.7 |

[1] The smaller the number, the better the efficiency.

The torsional modulus is measured by twisting the plasticized resin between two jaws, at various temperatures, and measuring the angle of deflection. The values are expressed in pounds per square inch × 10⁴.

The results in Table II show that a substitution of either normal hexanoic or pentanoic acid for normal heptanoic acid appreciably increases the volatility of the plasticizer and decreases the low temperature efficiency of the vinyl resin. The other properties of the resin were not adversely affected.

EXAMPLE 3

A study was undertaken to determine what effect is produced when a higher acid, such as normal octanoic acid, is used to prepare the trimethylol alkane esters.

Table III

| | Tensile strength, p.s.i. | | Efficiency torsional modulus (10⁴ units) at 25° C. |
|---|---|---|---|
| | Original | Aged [1] | |
| Trimethylolbutane: | | | |
| nC₇ acid | 2,670 | 2,785 | 0.34 |
| nC₈ acid | 2,430 | 2,525 | 0.51 |
| Trimethylolisobutane | | | |
| nC₇ acid | 2,775 | 2,670 | 0.30 |
| nC₈ acid | 2,570 | 2,610 | 0.48 |

[1] 7 Days at 100° C.

The data show that there is very little difference in behavior between the normal C₇ and C₈ esters insofar as the tensile strength of the resin is concerned, and that the main distinction lies in the torsional modulus of the plasticized resins at room temperature. In both instances, the resins containing the normal C₇ acid ester had a better efficiency at 25° C.

EXAMPLE 4

Branched-chain esters were prepared and compounded with Geon 101 resin according to the general procedure. The C₇ branched-chain acids were obtained by the Oxo process using C₆ olefins as the feed. The results are set forth in Table IV.

The results demonstrate that normal acid ester plasticizers have better aging characteristics and low temperature properties than the corresponding branched esters. While the volatility of the Oxo heptanoic esters was greater than that of the normal heptanoic acid esters, it was sufficiently lower than that obtained with commercial plasticizers, such as DOP, etc., to use them in resin products not requiring a high degree of plasticizer retention.

EXAMPLE 5

Two trimethylol alkanes, i.e., trimethylol butane and trimethylol isobutane, were esterified with mixtures of normal nonanoic acid and branched (Oxo) pentanoic acid having an average carbon number between about 6 and 8. The plasticized resins (Geon 101) prepared with these esters were compared with resins plasticized with normal heptanoic acid esters, in one case, and di-2-ethylhexyl phthalate in another.

Table V

| | Trimethylolbutane (2 moles nC₉— 1 mole Oxo C₅) | Trimethylolisobutane (1 mole nC₉— 2 moles Oxo C₅) | Trimethylolbutane (3 moles nC₇) | DOP |
|---|---|---|---|---|
| Tensile, p.s.i. | 2,750 | 2,820 | 2,775 | 2,950 |
| Elongation, percent | 295 | 290 | 295 | 295 |
| Aging characteristics (7 days at 100° C.): | | | | |
| Elong. retained | 97 | 98 | 98 | 65 |
| Tensile retained | 100 | 103 | 96 | 90 |
| Volatil. percent loss | 3 | 7 | 5 | 25 |

The results show that mixed esters make outstanding plasticizers, and that it is not necessary to use normal heptanoic acid exclusively, to esterify C₄ to C₅ trimethylol alkanes. The data show that as many as two of the three acids may be of the branched chain type. Thus, only 1 of the hydroxyl groups need be esterified with a straight-chain acid, the other two groups being esterified with oxo acids. This unexpected finding renders this invention extremely important, because straight-chain acids are not readily available and they cost considerably more than the oxo-type acids. For this reason, esters prepared with mixed acids having an average carbon number of between about 6.5 and 7.5 are especially preferred.

A plasticizer prepared by reacting trimethylol heptane with one mole of oxo C₅ acid and two moles of normal C₉ acid made the resin undesirably stiff. The C₃ and lower alkanes have been found to be inferior to the C₄ to C₅ alkanes. Thus the trimethylol derivatives of the latter compounds are preferred.

EXAMPLE 6

A sample of crude, undistilled trimethylolisobutane was esterified with 1 mole of normal nonanoic acid and 2 moles of branched (Oxo) pentanoic acid and stripped to a pot temperature of 200° C. at 0.2 mm. Another sample prepared from distilled trimethylolisobutane was esterified with the same acids and the esterified mixture was distilled under 0.2 mm. pressure to recover an ester boiling in the Table IV

| Plasticizer | Physical characteristics after aging 7 days at 100° C. | | | | | | Torsional modulus (10⁴ units) | |
|---|---|---|---|---|---|---|---|---|
| | Tensile, p.s.i. | Elong., percent | Percent retention | | Appearance | Percent plasticizer loss | | |
| | | | Tensile | Elong. | | | +25° C. | −25° C. |
| Trimethylolbutane: | | | | | | | | |
| nC₇ acid | 2,785 | 335 | 104 | 112 | Clear | 6.5 | 0.34 | 16.0 |
| Oxo C₇ | 2,780 | 275 | 93 | 86 | do | 14.9 | 0.35 | 23.5 |
| Trimethylolisobutane: | | | | | | | | |
| nC₇ acid | 2,670 | 290 | 96 | 98 | do | 4.7 | 0.30 | 16.3 |
| Oxo C₇ | 2,515 | 215 | 87 | 69 | Milky | 15 | 0.33 | 27.9 |
| Trimethylolpentane: | | | | | | | | |
| nC₇ acid | 2,670 | 315 | 102 | 103 | Clear | 4.1 | 0.37 | 17.3 |
| Oxo C₇ | 2,570 | 245 | 91 | 86 | Milky | 8.6 | 0.38 | 25.3 | range of 180–245° C. and having an average acid carbon number of about 6.5. Each of the samples was compounded with Geon 101 according to the general recipe, and the resulting products were evaluated as follows:

Table VI

|  | Distilled ester | Crude mixture of ester |
|---|---|---|
| Trimethylolisobutane: | | |
| Tensile, p.s.i. | 3,065 | 3,060 |
| Elongation, percent | 305 | 285 |
| Aging characteristics (after 7 days at 100° C.): | | |
| Elongation retention, percent | 100 | 105 |
| Tensile retention, percent | 92 | 102 |
| Volatility, percent loss | 28 | 11 |

The above data indicate that the undistilled product has a lower voltaility, as well as a superior elongation and tensile strength, after aging for 7 days at 100° C. The undistilled crude mixture is colorless and contains about 50% esterified material. The advantage of this discovery is that a suitable plasticizer may be prepared without distilling the trimethylol or ester.

EXAMPLE 7

Trimethylol isobutane was esterified with 1 mole of dibasic acid (adipic) and 2 moles of a monobasic acid (n-octanoic). It is believed that the effect of esterification is to combine two trimethylol alkane groups by means of the dibasic acid which esterifies one hydroxyl group in each of two trimethylol alkanes, the remaining hydroxyl groups being esterified with normal octanoic acid. The resulting plasticizer was compounded with Geon 101 according to the general formula and evaluated as follows:

Table VII

| Plasticizer | Trimethylol isobutane (adipic+ nC₈) | DOP |
|---|---|---|
| Aging properties (7 days at 100° C.): | | |
| Percent elong. retained | 104 | 65 |
| Plasticizer loss | 7 | 25 |
| Extraction in Primol D—percent loss | 8 | 10 |

The extractability of the plasticizer was determined by aging the resin pads for 7 days with Primol D at 52° C. and determining the loss in weight at the end of this period. The loss is measure of the ability of the plasticizer to diffuse out of the plastic, and for this reason a low value is preferred.

The results illustrate that compounding the complex ester with vinyl-type resins results in a product having better aging properties and lower extractability that conventional plasticizers, such as DOP. Other dibasic acids that may be used are succinic, glutaric, suberic, azelaic, etc.

In summary, therefore, it has been shown that esters prepared by condensing trimethylol alkanes containing between about 7 to 8 carbon atoms with normal and/or branched acids, make outstanding plasticizers for solid polymers, especially vinyl-containing resins. It has been found that the carbon content of the acid is a critical factor in the production of these plasticizers, and that it is necessary to have an average carbon number between about 6 and 8, preferably about 6.5 and 7.5, and especially about 7. Furthermore, it has been discovered while esters made solely from branched-chain esters are inferior to those prepared with normal acids, esters prepared with mixed normal and straight-chain acids are better than straight-chain esters in several ways.

Resort may be had to modifications and variations of these plasticizers without departing from the spirit of the present invention or the scope of the appended claim.

What is claimed is:

A plasticized resin comprising 100 parts by wt. of a vinyl resin chosen from the group consisting of polyvinyl chloride, polyvinyl acetate, and copolymers of 80 to 95 wt. percent of vinyl chloride, and 5 to 20 wt. percent of vinyl acetate; and about 25 to 75 parts by wt. of a trimethylol alkane chosen from the group consisting of trimethylol butane, trimethylol isobutane, and trimethylol pentane, which has been completely esterified with normal heptanoic acid.

References Cited in the file of this patent

UNITED STATES PATENTS

| 2,783,270 | Polly et al. | Feb. 26, 1957 |
| 2,794,008 | Ginsler | May 28, 1957 |
| 2,809,186 | Smith et al. | Oct. 8, 1957 |
| 2,875,241 | Miller et al. | Feb. 24, 1959 |

OTHER REFERENCES

Chem. Eng., p. 164, vol. 54, March 1947.
Hackh's Chem. Dict., pp. 673, 895, 3rd Ed., Blakiston Co. (1944).